United States Patent
Arroyo et al.

(10) Patent No.: US 9,455,938 B2
(45) Date of Patent: *Sep. 27, 2016

(54) STREAMING METHODS AND SYSTEMS FOR NETWORK DEVICES

(71) Applicant: KIP CR P1 LP, New York, NY (US)

(72) Inventors: Keith M. Arroyo, Austin, TX (US); Stephen K. Wilson, Austin, TX (US)

(73) Assignee: KIP CR P1 LP, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/519,977

(22) Filed: Oct. 21, 2014

(65) Prior Publication Data

US 2015/0039783 A1 Feb. 5, 2015

Related U.S. Application Data

(63) Continuation of application No. 13/312,068, filed on Dec. 6, 2011, now Pat. No. 8,904,023, which is a continuation of application No. 10/914,574, filed on Aug. 9, 2004, now Pat. No. 8,271,673, which is a continuation of application No. 10/002,995, filed on Nov. 30, 2001, now abandoned, which is a continuation of application No. 09/259,160, filed on Feb. 26, 1999, now Pat. No. 6,341,315.

(51) Int. Cl.
*H04L 12/861* (2013.01)
*H04L 29/08* (2006.01)
*G06F 3/06* (2006.01)

(52) U.S. Cl.
CPC .......... *H04L 49/9005* (2013.01); *H04L 49/90* (2013.01); *H04L 67/1097* (2013.01); *G06F 3/067* (2013.01); *G06F 3/0626* (2013.01); *G06F 3/0659* (2013.01)

(58) Field of Classification Search
CPC .................................... H04L 49/9005
USPC ................. 709/213, 231, 250; 710/1, 25, 52
See application file for complete search history.

(56) References Cited

U.S. PATENT DOCUMENTS

| 5,197,128 A | 3/1993 | Campbell et al. |
| 5,452,464 A | 9/1995 | Nomura et al. |
| 5,487,167 A | 1/1996 | Dinallo et al. |
| 5,519,695 A | 5/1996 | Purohit et al. |
| 5,566,315 A | 10/1996 | Milillo et al. |

(Continued)

OTHER PUBLICATIONS

"Routers with very small buffers"—Enachescu et al, Stanford EDU, Jul. 1998 http://theory.stanford.edu/~tim/papers/buffer-sizing.pdf.*

(Continued)

*Primary Examiner* — Randy Scott
(74) *Attorney, Agent, or Firm* — Sprinkle IP Law Group

(57) ABSTRACT

A system and method are disclosed for processing commands to network target devices through a SCSI router in a Fiber Channel network having a plurality of Fiber Channel hosts. The system may be configured to receive a command, and determine that the command requires a transfer of data larger than a threshold size. The system may also be configured to receive a plurality of data blocks associated with the command, store the plurality of data blocks in at least one buffer, and determine if there is an initial amount of data in the at least one buffer. The system may be further configured to forward at least one of the plurality data blocks, and request an additional data block associated with the command.

20 Claims, 6 Drawing Sheets

(56) References Cited

U.S. PATENT DOCUMENTS

| | | | |
|---|---|---|---|
| 5,598,581 | A | 1/1997 | Daines et al. |
| 5,630,067 | A * | 5/1997 | Kindell ................ G06F 9/5011 |
| | | | 709/231 |
| 5,729,719 | A | 3/1998 | Gates |
| 5,732,094 | A | 3/1998 | Petersen et al. |
| 5,737,635 | A | 4/1998 | Daines et al. |
| 5,742,792 | A | 4/1998 | Yanai et al. |
| 5,748,633 | A | 5/1998 | Lawler et al. |
| 5,812,775 | A | 9/1998 | Van Seters et al. |
| 5,825,774 | A | 10/1998 | Ready et al. |
| 5,867,495 | A | 2/1999 | Elliott et al. |
| 5,872,920 | A | 2/1999 | Hausman et al. |
| 5,881,245 | A | 3/1999 | Thompson |
| 5,893,138 | A | 4/1999 | Judd et al. |
| 5,930,252 | A * | 7/1999 | Aaker ................ H04Q 11/0478 |
| | | | 370/395.2 |
| 5,941,972 | A | 8/1999 | Hoese et al. |
| 6,026,088 | A | 2/2000 | Rostoker et al. |
| 6,041,381 | A | 3/2000 | Hoese |
| 6,061,504 | A | 5/2000 | Tzelnic et al. |
| 6,061,753 | A | 5/2000 | Ericson |
| 6,097,718 | A | 8/2000 | Bion |
| 6,118,776 | A | 9/2000 | Berman |
| 6,122,667 | A | 9/2000 | Chung |
| 6,138,161 | A | 10/2000 | Reynolds et al. |
| 6,145,068 | A | 11/2000 | Lewis |
| 6,167,054 | A | 12/2000 | Simmons et al. |
| 6,205,141 | B1 | 3/2001 | Arroyo |
| 6,247,040 | B1 * | 6/2001 | Born ..................... G06F 3/0626 |
| | | | 710/264 |
| 6,252,849 | B1 | 6/2001 | Rom et al. |
| 6,338,090 | B1 | 1/2002 | Emmes et al. |
| 6,341,315 | B1 | 1/2002 | Arroyo et al. |
| 6,351,780 | B1 | 2/2002 | Ecclesine |
| 6,396,907 | B1 | 5/2002 | Didcock |
| 6,425,034 | B1 | 7/2002 | Steinmetz et al. |
| 6,438,101 | B1 * | 8/2002 | Kalampoukas ......... H04L 47/10 |
| | | | 370/229 |
| 6,445,679 | B1 | 9/2002 | Taniguchi et al. |
| 6,614,796 | B1 | 9/2003 | Black et al. |
| 8,271,673 | B2 | 9/2012 | Arroyo et al. |
| 8,904,023 | B2 | 12/2014 | Arroyo et al. |
| 2001/0043586 | A1 | 11/2001 | Miloslavsky et al. |

OTHER PUBLICATIONS

Office Action for U.S. Appl. No. 09/259,160, mailed Feb. 28, 2001, 7 pgs.

International Preliminary Examination Report for International Application No. PCT/US00/05056, Patent Cooperation Treaty, completed Feb. 4, 2001, 3 pgs.

International Search Report for International Application No. PCT/US00/05056, Patent Cooperation Treaty, mailed Mar. 20, 2001, 3 pgs.

Snively, Robert, Implementing a Fibre Channel SCSI Transport, 1994 Compcon Spring '94, Digest of Papers, pp. 78-82.

Examiner's First Report for Australian Patent Application No. 33835/00, dated Jan. 9, 2003, 1 pg.

Office Action for U.S. Appl. No. 10/002,995, mailed Oct. 14, 2003, 20 pgs.

"Seagate Software Certified Exabyte Corporation's Fibre Channel Router and DLT Tape Library," Nov. 16, 1998, PR Newswire, New York, 3 pgs.

"Crossroads Router Technology is Part of Compaq's New Storage Area Network Backup Solution," Nov. 2, 1998, PR Newswire, New York, 2 pgs.

"Exabyte Announces New Fibre Channel-to-SCSI Router Storage Networking Solution FC12 to include New Browser-based Monitoring Tool," Jan. 11, 1999, PR Newswire, New York, 2 pgs.

Docs.sun.com—Sun Product Documentation, "SCSI and SCSA," from http://docs.sun.com/db.doc/805-3024/6j2sumi5e?a+, date unknown.

Office Action for U.S. Appl. No. 10/002,995, mailed Apr. 7, 2004, 8 pgs.

Office Action for U.S. Appl. No. 10/914,574, mailed Mar. 30, 2009, 24, pgs.

Office Action for U.S. Appl. No. 10/914,574, mailed Nov. 18, 2009, 19 pgs.

Office Action for U.S. Appl. No. 10/914,574, mailed May 25, 2010, 49 pgs.

Office Action for U.S. Appl. No. 10/914,574, mailed Dec. 22, 2010, 50 pgs.

Office Action for U.S. Appl. No. 10/914,574, mailed Jun. 27, 2011, 24 pgs.

Fibre Channel—Tape (FC-Tape), Information Technology Industry Council, Rev. 1.04a, May 22, 1998, 147 pgs., retrieved at <http://www.t11.org/ftp/t11/member/fc/tape/98-124v5.pdf>.

NCR 53C300 SCSI Buffer Controller Product Manual, NCR Microelectronics Division, Colorado Springs, CO, Dec. 1987, 47 pgs., at http://bitsavers.org/pdf/ncr/scsi/53C300_SCSI_Buffer_Controller_Product_Manual_Dec87.pdf.

Office Action for U.S. Appl. No. 13/312,068, mailed Feb. 1, 2012, 13 pgs.

"Writing Device Drivers"—Sun Microsystems Oct. 1998, retrieved at <http://docs.oracle.com/cd/E19620-01/805-3024/805-3024.pdf>, 501 pgs.

Office Action for U.S. Appl. No. 13/312,068, mailed Jul. 31, 2012, 11 pgs.

Notice of Allowance for U.S. Appl. No. 13/312,068, mailed Jul. 21, 2014, 6 pgs.

Fibre Channel to SCSI Routers, Exabyte FC11 and FC12, Installation and Operation, Oct. 1998, Exabyte Corp., Boulder, CO, #328311-001 retrieved at <http://support.tandbergdata.com/legacy/documentation/connectivity/32831101.pdf?CFID=6041635&CFTOKEN=42533204>.

\* cited by examiner

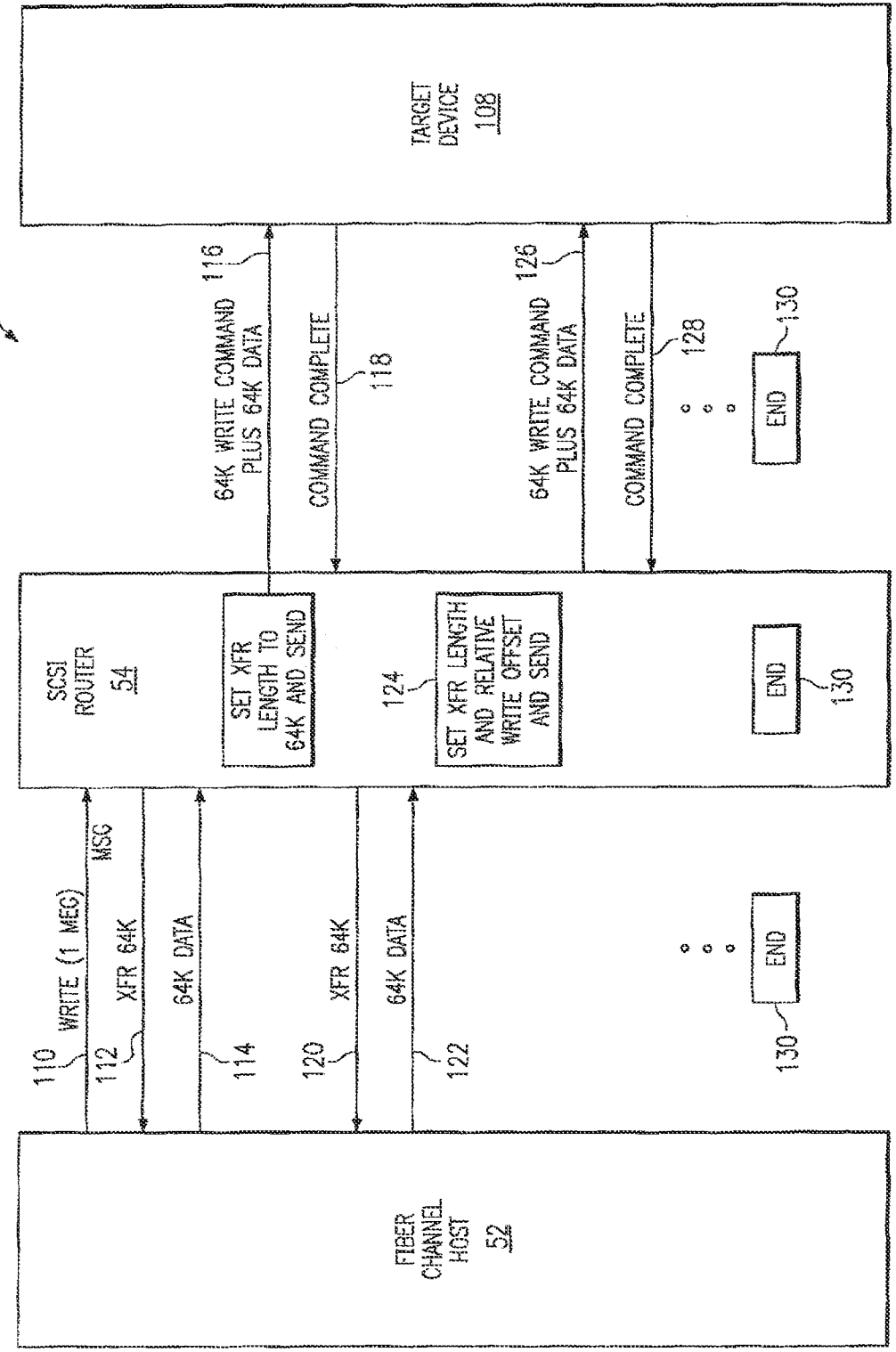

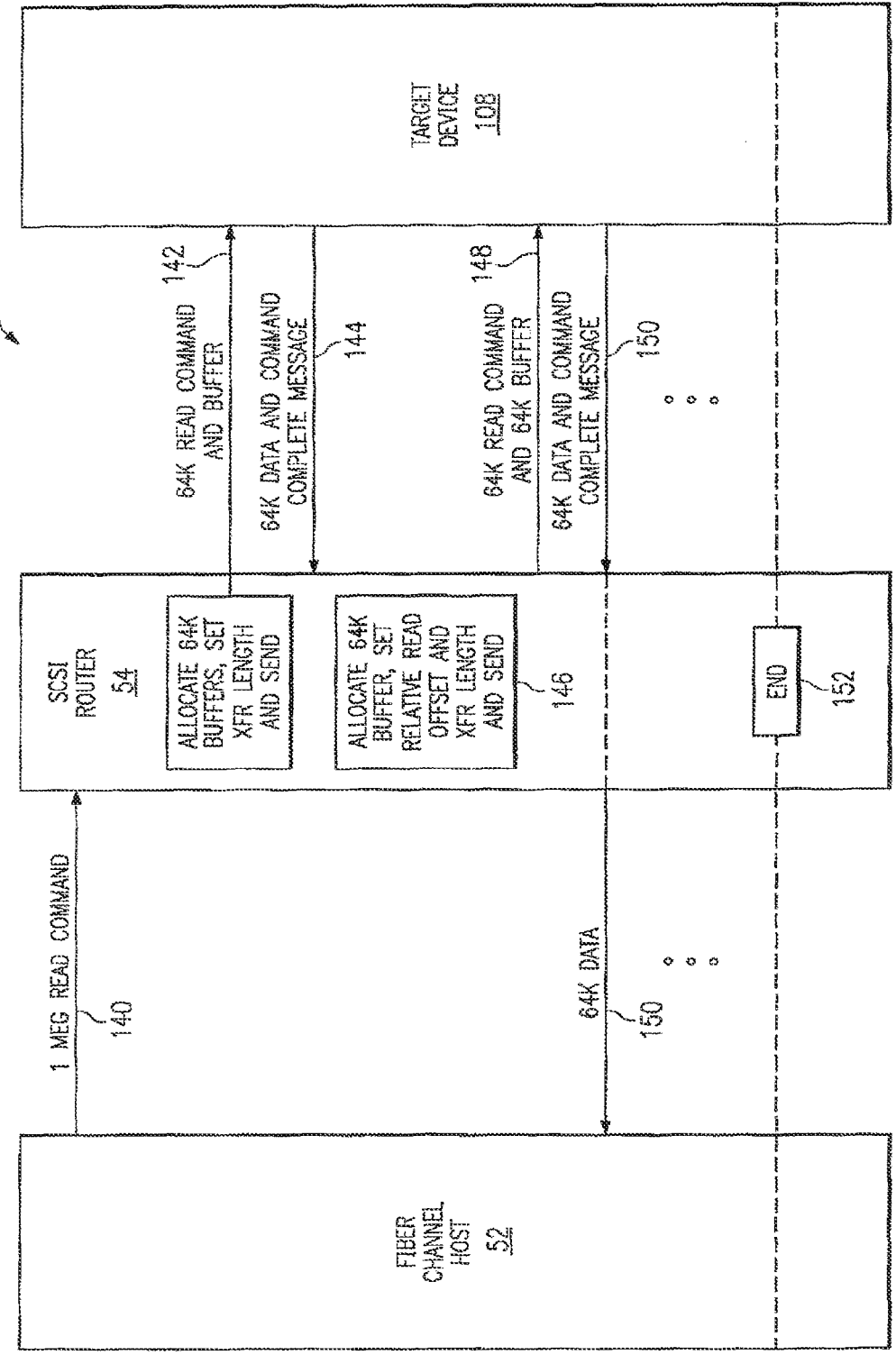

STREAMING METHODS AND SYSTEMS FOR NETWORK DEVICES

RELATED APPLICATIONS

This application is a continuation of, and claims priority from U.S. patent application Ser. No. 13/312,068, filed Dec. 6, 2011, entitled "Streaming Method and System for Fibre Channel Network Devices," which is a continuation of, and claims priority from U.S. patent application Ser. No. 10/914,574, filed Aug. 9, 2004, entitled "Streaming Method and System for Fibre Channel Network Devices," which is a continuation of U.S. patent application Ser. No. 10/002,995, filed Nov. 30, 2001, entitled "Streaming Method and System for Fibre Channel Network Devices," which is a continuation of U.S. patent application Ser. No. 09/259,160, filed on Feb. 26, 1999, now U.S. Pat. No. 6,341,315, issue date Jan. 22, 2002, entitled "Streaming Method and System for Fibre Channel Network Devices," the entire contents of which are hereby incorporated by reference herein.

TECHNICAL FIELD OF THE INVENTION

This invention relates generally to data and information communication systems and their operation, and, more particularly, to communications networks, including a Fibre Channel network. Even more particularly, the present invention relates to a streaming method for Fibre Channel network devices that provides the ability to handle read/write requests from multiple Fibre Channel hosts that are larger in size than the available memory in a SCSI router by streaming data outward to the network device as data is received from a Fibre Channel host, or vice versa.

BACKGROUND OF THE INVENTION

In a Fibre Channel-to-SCSI router architecture, one SCSI initiator (interface), such as a SCSI router, can speak to multiple SCSI targets on behalf of many Fibre Channel ("FC") initiators (hosts). The SCSI router serves as an interface to efficiently manage commands and communications between the FC initiators and the SCSI targets. On the SCSI side of the network, each of the SCSI targets is only aware of the SCSI router interface connection to which it is directly attached, and likewise each of the FC hosts sees only the SCSI router as a target. Neither the FC hosts nor the SCSI targets are aware of targets or initiators, respectively, on the other side of the SCSI router to which they are connected.

In a Fibre Channel-to-SCSI network, a SCSI router provides a pass-through data management role. For example, when a Fibre Channel host issues a command to a SCSI target the SCSI router receives the command and forwards it to the target. To the FC host, the SCSI router is the target, and the data management role provided by the SCSI router is transparent to the host. Similarly the SCSI target on the other side of the SCSI router sees the SCSI router to which it is attached as the initiator of the command. The data management role provided by the SCSI router is likewise transparent to the SCSI target.

As part of their data management role, SCSI routers in a Fibre Channel-to-SCSI network receive read and write commands from FC hosts. The amount of data contained in these read/write commands can be more than the capacity of the memory in the SCSI router. For example, a write command might consist of a one megabyte ("meg") stream of data while the SCSI router may have only a half meg worth of memory buffers to receive, store and forward the write command.

In a typical existing SCSI router implementation, the SCSI router saves the data and routes it to the target device. If the target device is a sequential access device, such as a tape backup, this can result in rejection of the command and possible corruption of the data if the available memory in the SCSI router is insufficient to capture all the data. Existing router architectures typically have no mechanism for dealing with this situation. Existing SCSI routers likewise have no mechanism available for informing the FC host of the available memory size prior to the host issuing the command. Although there are some existing SCSI router implementations that provide for initial discovery of available memory by the FC host, these methods are inefficient, slow and expensive to implement.

Existing systems and methods for managing data flow in a Fibre Channel-to-SCSI network typically store all the data associated with a command in the SCSI router memory before forwarding the data to the SCSI target device. Once the storing event is complete, the write or read to the SCSI target is performed. Therefore, even when there is enough physical memory present to handle a read or write command, current systems provide relatively low performance and efficiency because available memory buffers are tied up until the read or write command is complete. These memory buffers cannot be used by other FC hosts until the current read or write command has completed execution. Current systems therefore both tie-up available memory resources for a longer time than necessary and limit Fibre Channel network performance, even in situations where the SCSI router memory is enough to handle the data associated with a read or write command.

In a Fibre Channel-to-SCSI network the possibility also exists that a SCSI target may be incapable of receiving data at the same rate that a FC host is providing the data. For example, during a write event a Fibre Channel host may provide a larger data stream than the intended SCSI target is currently capable of receiving. In such a case, the SCSI router interface attempts to match the data transfer rates between the Fibre Channel host and the SCSI target or risks corruption and possible loss of data. In currently existing Fibre Channel-to-SCSI data management methods and systems if the available memory buffer space is insufficient to provide a delay to match the data rates between the FC host and the SCSI target, the command may be aborted and the data being transferred may be corrupted or lost. Currently existing systems and methods do not have the capability to hold-off the FC host until enough memory buffer space becomes available.

Additionally, because currently existing Fibre Channel-to-SCSI network data management systems and methods typically store an entire read or write command data before forwarding the data to or from the SCSI target, subsequent requests to use the memory cannot be satisfied until the prior command is complete. In a situation where sufficient memory is unavailable to process additional commands from a FC host (or from a different FC host), currently existing systems and methods reject the command and the command is lost unless it is reissued by the host.

In prior art systems, a read/write command requiring a data transfer larger than the available buffer memory size would typically get rejected. This could result not only in corruption or loss of data, but in a failure of the FC host or the SCSI target involved in the data transfer. This is not a good situation because it means that the SCSI router is incompatible with the FC host. Especially in the case of a sequential access target device, the backup or transfer in progress could fail and the target device might have to be reset. Prior art systems dealt with this problem by limiting the size of read/write commands. This solution resulted in reduced network performance.

Furthermore, in the case of a sequential access target device, it is not possible to break-up a write or read command into discrete pieces that can be written to the target at different physical locations. For example, if a FC host issues a 1,024K write command to a sequential access device, the sequential access device will write the data to a physically continuous 1,024K memory block. The sequential access target device expects to subsequently read the data as a 1024K continuous block with a single end-of-record indicator at the end of the read. If an end-of-record indicator were present anywhere else in the data, a sequential access device would fail and the operation aborted. For this reason, a read/write command to or from a sequential access device in a prior art system had to be stored completely in the available SCSI router memory and then transferred to the target device so as to be physically written in a continuous manner.

Prior art Fibre Channel-to-SCSI data management methods and systems implemented within a SCSI router also require larger amounts of memory to deal with the limitations inherent to sequential access devices. This results in a correspondingly higher cost.

SUMMARY OF THE INVENTION

Therefore, there is a need for a streaming method and system for Fibre Channel network devices that addresses the performance limitations arising in known such methods and systems. In particular, a need exists for a FC streaming method and system that provides the capability for processing read/write commands that are larger in size than the available SCSI router memory without the adverse effect in network performance and possible data loss problems occurring in known Fibre Channel-to-SCSI architecture command processing methods and systems.

A still further need exists for a streaming method and system that avoids the complexity and cost inherent to currently existing command processing methods and systems that require FC hosts to determine the available memory buffer size before sending a read or write command.

A further need exists for a streaming method and system for Fibre Channel network devices providing the capability to deliver data to a target device while concurrently receiving data from a host (or vice versa) so as to provide an in-and-out data stream between the host and the target device through a SCSI router.

A still further need exists for a Fibre Channel network streaming method and system having the capability to process any size data transfer between a Fibre Channel host and a target device.

An even further need exists for a streaming method and system providing the capability to match the data transfer rates between a Fibre Channel host and a target device so as to avoid the data corruption and loss problems of currently existing command processing methods and systems. Such a streaming method and system can hold-off initiator data transfers until the necessary memory becomes available to store the data and forward it to a lower data rate capable target device.

A further need exists for a streaming method and system having the capability to process read/write commands from multiple FC hosts to multiple target devices.

An even further need exists for a streaming method and system that can queue commands from one or more Fibre Channel hosts within the SCSI router interface such that subsequent commands are not lost while awaiting execution of a prior command.

A still further need exists for a streaming method and system that provides command processing in a Fibre Channel-to-SCSI router interface without the cost and physical memory requirements of current command processing methods and systems while providing increased performance and efficiency.

In accordance with the present invention a system and method for processing commands to target devices through a SCSI router in a Fibre Channel-to-SCSI network is provided that substantially eliminates or reduces disadvantages and problems associated with known such systems and methods, including the problems of limited network performance, loss of data in certain applications and general application failures. More specifically, the present invention provides a system and method for processing commands to network target devices through a SCSI router in a Fibre Channel network having a plurality of Fibre Channel hosts. In the case of a sequential access target device, the method includes the steps of, in the SCSI router, initializing one or more memory modules into preset size memory buffers and receiving a command from one of the plurality of Fibre Channel hosts. The SCSI router can be any kind of router that can serve as a Fibre Channel-to-SCSI interface in a Fibre Channel-to-SCSI architecture, such as a Crossroads Systems, Inc., of Austin, Tex., Model 4100 or 4200 SCSI Router. The Fibre Channel network can be a Fibre Channel arbitrated loop or switch network or other network topology.

If the command received requires a transfer of data larger than a threshold size, the method of this invention streams the data to the target device by first determining if a preset size memory block is free. The memory block itself can be comprised of one or more memory buffers. If the memory block is free, the method of the present invention requests a preset size data block from the Fibre Channel host that issued the command. Otherwise, the method of this invention holds-off the Fibre Channel host by waiting until the preset size memory block is available and then requesting the data block from the Fibre Channel host. The SCSI router receives a data block from the Fibre Channel host that issued the command and stores the data block in a FIFO queue. The steps of determining if the preset size memory block is free and requesting a data block from the Fibre Channel host are repeated until an initial number of data blocks are received and stored in the FIFO queue.

The system and method of this invention forward the command and the first of the data blocks received and stored in the FIFO queue to the sequential access target device ("SATD"). The SATD requests the next data block from the FIFO queue. Subsequent data blocks in the FIFO queue are forwarded to the SATD upon request until a trigger number of data blocks remain in the FIFO queue. The SCSI router maintains this trigger number of data blocks in the FIFO queue until all the data is received from the Fibre Channel host. The SCSI router maintains the trigger number of data blocks by simultaneously receiving additional data blocks from the Fibre Channel host and storing them in the FIFO queue and forwarding the topmost data block in the FIFO queue to the SATD.

The SATD requests additional data blocks from the SCSI router until it has received all of the data associated with the command. The SCSI router maintains a data block available to forward to the SATD by requesting a data block from the FC host to replace the topmost data block in the FIFO queue as the topmost data block is forwarded to the SATD.

If the command received from the FC host requires a transfer of data smaller than the threshold size, the method of this invention stores all of the data in one or more memory buffers as they became available and simply forwards the data to the SATD. The streaming capability of this invention is not required in such a case.

An alternative embodiment of the method and system of this invention provides for the streaming of data to a random access target device ("RATD"). In this alternative embodiment, an individual command for each block of data transferred is forwarded to the RATD. Unlike a SATD, a RATD is capable of writing and reading data as discrete packets stored in physically separated locations on the recording media. These data packets can be recombined into an original continuous piece of data larger than the individual component data packets. SATDs on the other hand, require that all data that is part of a single read or write command be written as a physical continuous piece of data on the recording surface.

The streaming method for Fibre Channel network devices of this invention can also be implemented in a Fibre Channel-to-SCSI network having more than one SCSI router. Similarly, the method of this invention can also be implemented in a Fibre Channel-to-SCSI network having multiple targets and multiple FC hosts connected through one or more SCSI routers. In the case of a Fibre Channel network having multiple SCSI routers, the method of this invention can be implemented separately within each of the SCSI routers.

A technical advantage of the streaming method of the present invention is the capability for handling read/write commands to a target device that are larger in size than the available memory in a SCSI router without a decline in network performance and the possible data loss problems occurring in known Fibre Channel-to-SCSI architecture command processing methods and systems.

Another technical advantage of the present invention is the capability to stream data to a target device while avoiding the complexity and cost inherent to currently existing command processing methods and systems that require a Fibre Channel host to determine the available memory buffer size within a SCSI router before sending a read or write command.

A further technical advantage of the present invention is the capability to deliver data to a target device while concurrently receiving data from a Fibre Channel host device (or vice versa) so as to provide an in and out data stream (streaming) between the Fibre Channel host and the target device through a SCSI router.

A still further technical advantage of the present invention is the capability to match data transfer rates between a Fibre Channel host and a SCSI target device so as to avoid the data corruption and data loss problems of currently existing command processing methods and systems.

Still another technical advantage of the present invention relates to its ability to process read/write commands from multiple Fibre Channel hosts to multiple targets devices. Such a streaming method and system provides the capability to queue commands from the same or other Fibre Channel hosts within the SCSI router interface so that subsequent commands are not lost while awaiting execution of a prior command.

A still further technical advantage of the present invention is that it provides command processing in a Fibre Channel-to-SCSI router interface without the cost and physical memory requirements of current command processing methods and systems while still providing increased performance and efficiency.

An even further technical advantage of the present invention relates to its ability to be made part of a Fibre Channel network with little additional cost. Generally, the method of the present invention may be implemented as a change in the instructions that control the processing of commands to a target device in a Fibre Channel network. These changes may be implemented in a hardware protocol chip for controlling the protocol operations within the network. Even this modification may be done with relatively little expense.

BRIEF DESCRIPTION OF THE DRAWINGS

A more complete understanding of the present invention and the advantages thereof may be acquired by referring to the following description, taken in conjunction with the accompanying drawings in which like reference numbers indicate like features and wherein:

FIG. 6 is a conceptual hybrid flow/block diagram illustrating the streaming method of this invention for writing to a random access target device; and FIG. 7 is a conceptual hybrid flow/block diagram illustrating the streaming method of this invention for reading from a sequential access target device.

DETAILED DESCRIPTION OF THE INVENTION

Figure 1:
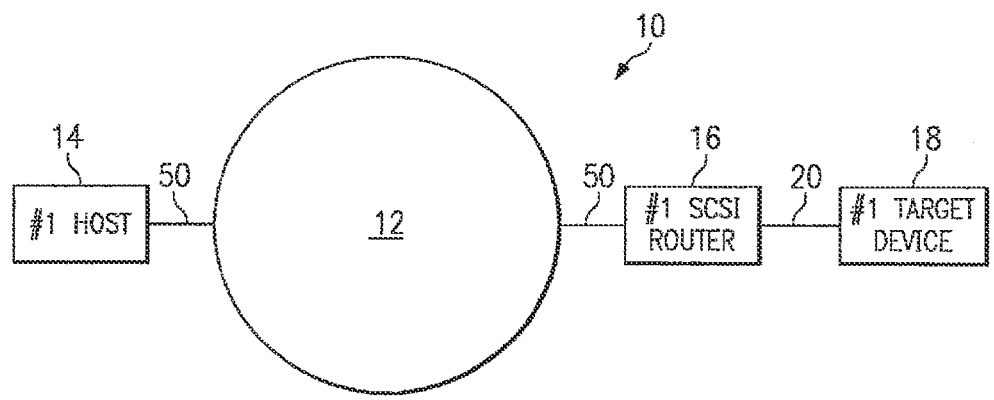
FIG. 1 is a conceptual diagram illustrating a Fibre Channel network for implementing the streaming method for Fibre Channel network devices of this invention.

Preferred embodiments of the present invention are illustrated in the FIGUREs, like numerals being used to refer to like and corresponding parts of the various drawings.

The present invention can provide a greater throughput capacity for read/write commands to and from a Fibre Channel host and a network target device in a Fibre Channel-to-SCSI network. When implemented in a SCSI router, the streaming method and system of the present invention can provide faster and greater capacity data transfers using the same amount of SCSI router memory as in existing command processing methods and systems. In a similar fashion the streaming method of the present invention can provide, with a smaller amount of router memory (and the corresponding decrease in cost), the same or greater capacity, speed and efficiency than currently existing systems and methods. Additionally, the streaming method of this invention avoids the complex and costly interrogation method used by some current systems and methods to determine available memory buffer space.

The streaming method of the present invention can provide for streaming of data between a Fibre Channel host and a target device. Streaming refers to a method for transferring data in which data is received from a Fibre Channel host at the same rate that it is forwarded to the intended SCSI target device, or vice versa. One advantage of streaming data between a Fibre Channel host and a SCSI target device is that memory buffers in the router are made available for use at a faster rate than in current systems, which store the entire data stream associated with a command before forwarding the data stream to a target device. Memory buffers are rapidly turned around in order to be available for the next data block coming through the SCSI router.

Once an initial amount of data is stored in available memory buffers and placed in a FIFO (first in, first out) queue, the first data block in the FIFO queue is forwarded to the target device. The target device requests the next block of data when it is ready to receive further data. The streaming method of the present invention forwards blocks of data to the target device as requested until a trigger number of data blocks remain in the FIFO queue.

When the trigger number of data blocks remain in the FIFO queue, the method of this invention sends a transfer ready command to the Fibre Channel host requesting the next data block from the host while simultaneously forwarding the topmost block of data in the FIFO queue to the target device. In this manner, the streaming method of this invention streams data between the Fibre Channel host and the target device once a threshold amount of data has been stored and placed in a first in/first out queue.

Network efficiency and functionality are improved by avoiding the possible data loss and/or corruption associated with the inability of current command processing systems to process read/write commands that are larger than the available memory space in the SCSI router. The cost and complexity associated with current system's memory requirements and/or complex interrogation methods to determine the available buffer space in the router are also avoided. Implementation of this invention can be easily achieved in currently existing routers, such as the Crossroads Systems, Inc., Model 4100 or 4200.

The method of the present invention is equally functional a Fibre Channel network having more than one SCSI router, each of which can have multiple network target devices attached to and receiving commands from it. By allowing the processing of read/write commands regardless of their size, the method of the present invention significantly improves the robustness of SCSI in a Fibre Channel environment.

In FIG. 1 there appears a conceptual diagram of Fibre Channel network 10 in which the method and system of this invention can be implemented. Fibre channel network 10 can include network link 12 for connecting #1 host 14 with #1 SCSI router 16 via network links 50. #1 target device 18 connects to #1 SCSI router 16 via SCSI network link 20. Network links 50 can be any Fibre Channel network connection and network link 20 can be any SCSI network connection. FIG. 1 is a simple one host/one target Fibre Channel to SCSI network, but the streaming method and system of the present invention can be implemented in a Fibre Channel network having multiple Fibre Channel hosts, multiple SCSI routers and multiple network target devices.

Figure 2:
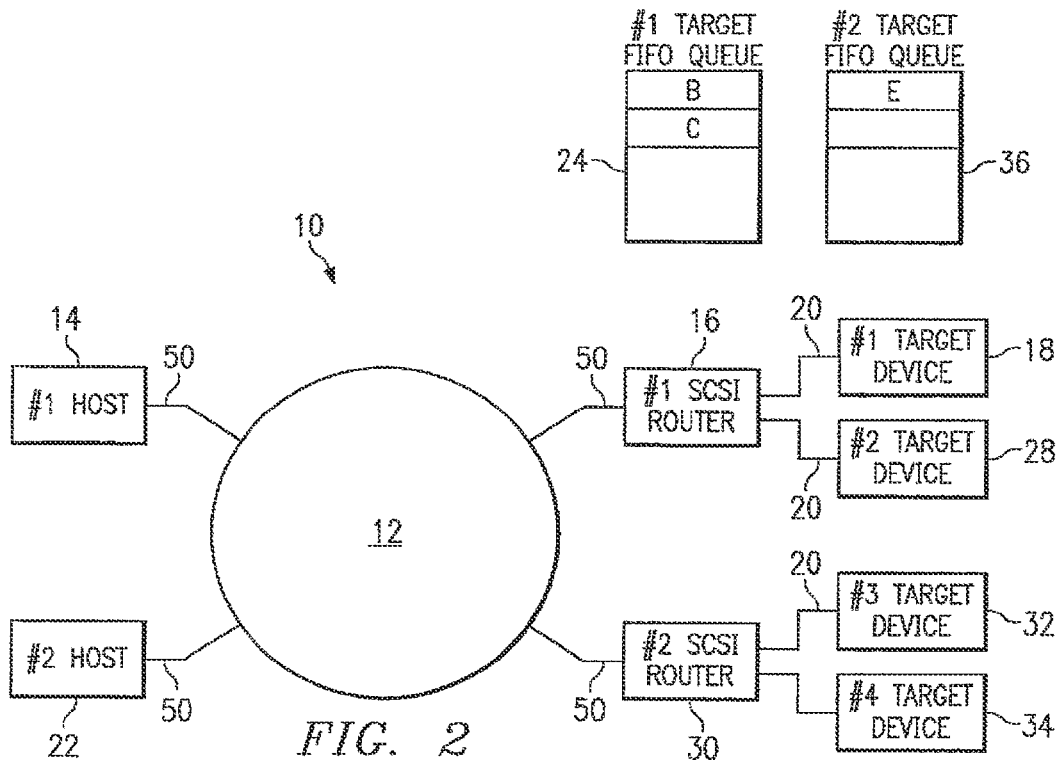
FIG. 2 is a conceptual diagram of a Fibre Channel network for implementing the streaming method of this invention having multiple Fibre Channel hosts, SCSI routers, and network target devices.

FIG. 2 shows a modified Fibre Channel network 10 illustrating the capability of the present invention to process commands from multiple Fibre Channel hosts to multiple target devices through multiple SCSI routers. Fibre channel network 10 now includes #2 host 22 and #2 SCSI router 30 communicatively connected to Fibre Channel network link 12 via network links 50.

1 SCSI router 16 is now communicatively connected to #1 target device 18 and #2 target device 28 via network link 20. #2 SCSI router 30 is communicatively connected to #3 target device 32 and #4 target device 34 via network links 20. While FIG. 2 shows a closed Fibre Channel network 10, it is possible to add both SCSI routers, FC hosts, and target devices to Fibre Channel network 10. The streaming method of the present invention can function with multiple hosts, multiple SCSI routers and multiple target devices. The number of SCSI routers, target devices and hosts is limited by the SCSI router and Fibre Channel network capacity.

Figure 3:
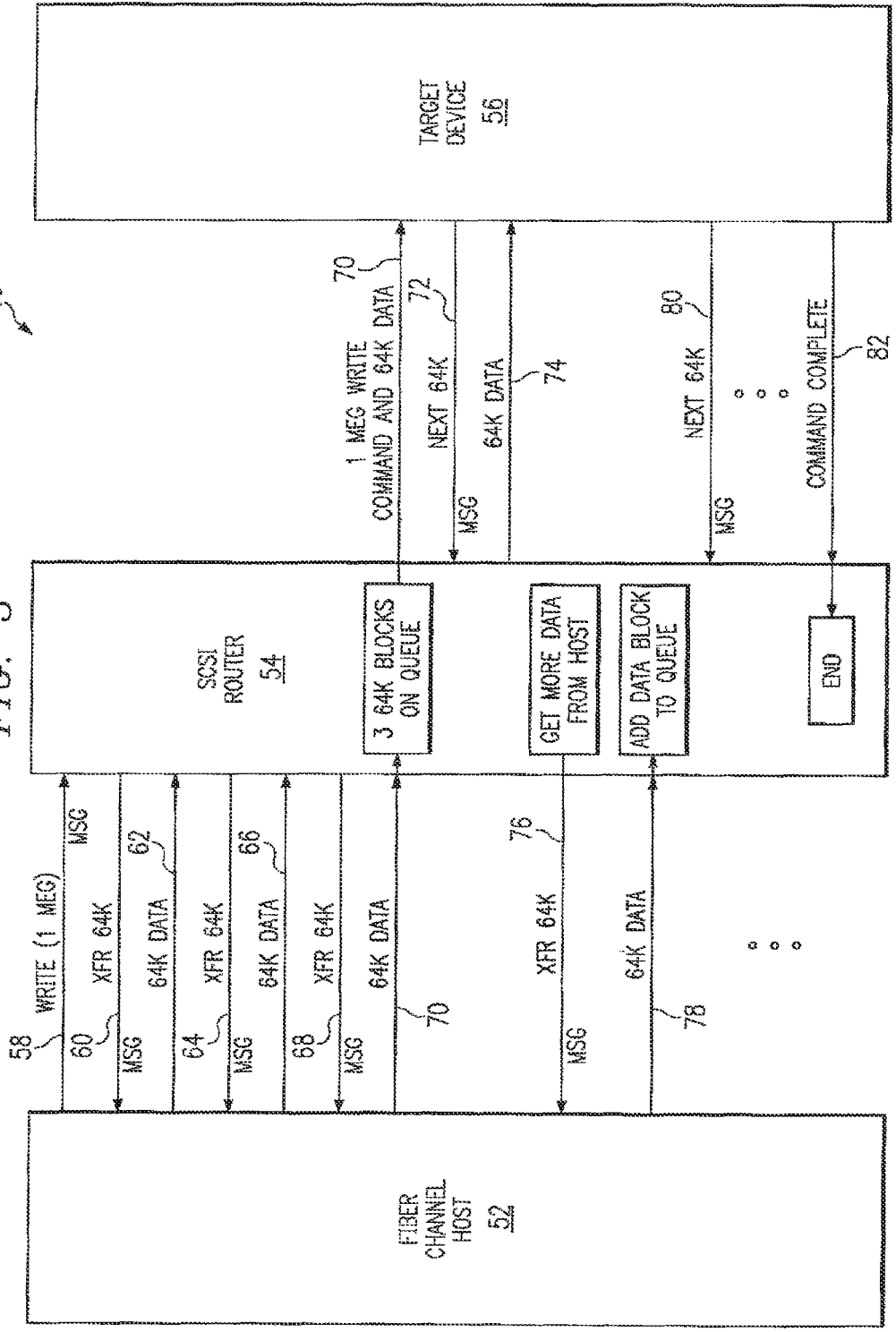
FIG. 3 is a conceptual hybrid flow/block diagram illustrating the streaming method of this invention for writing to a sequential access target device.

FIG. 3 is a conceptual hybrid flow diagram/block diagram illustrating the streaming method of this invention for a sequential access device using a sample 1 megabyte write command. FIG. 3 illustrates the method of this invention with SCSI router 54 on-line and operational and with the memory in SCSI router 54 initialized into preset size memory buffers. FIG. 3 includes Fibre Channel network 10 comprised of Fibre Channel host 52, SCSI router 54, and SCSI target device 56, which in this example is a sequential access target device. The network connections that are a part of Fibre Channel network 10 are not shown in FIG. 3.

At step 58 of FIG. 3, Fibre Channel host 52 issues a one meg write command to SCSI router 54. SCSI router 54 determines that the write command is larger than a threshold size, 192K in this example, and implements the streaming method of this invention. SCSI router 54 determines if a preset size memory block is free, in this example a 64K memory block. If, as shown in FIG. 3, the preset size memory block is free, SCSI router 54 issues, at step 60, a transfer ready command to Fibre Channel host 52 requesting a 64K block of data. If the preset size memory block is not available, the streaming method of this invention holds-off Fibre Channel host 52 until the required memory block is free.

Holding-off of Fibre Channel host 52 involves not issuing a transfer ready command until the preset size memory block is available. The streaming method of the present invention can determine if the preset size memory block is available using a buffer queue containing pointers to empty memory buffer locations in the available memory module(s) of SCSI router 54. This is shown more specifically in FIG. 4.

The ability to hold-off the Fibre Channel host 52 until a sufficiently large block of memory buffers is available allows the streaming method of this invention to do away with the prior art interrogation technique used to determine available memory buffer space. Fibre Channel host 52 is held-off by not sending a transfer ready command from SCSI router 54. In this way, Fibre Channel host 52 is kept from falling into an error correction mode because it does not receive a signal that SCSI router 54 is not ready, but instead simply waits until it gets recognition that SCSI router 54 is ready to receive the data. The capability to hold-off Fibre Channel host 52 can provide for a more efficient use of SCSI router memory and consequently for the ability to satisfy requests from multiple Fibre Channel hosts 52. Holding-off Fibre Channel host 52 can prevent the loss of additional commands coming from other hosts, which might be the case if a "not ready" or "queue full" signal were returned from SCSI router 54 to Fibre Channel host 52 instead of simply waiting until the memory buffers are available.

When a sufficiently large block of memory buffers is unavailable, the streaming method of this invention can store the command from Fibre Channel host 52 in a command queue and retry the command internally until the memory buffers necessary to carry out the command become available. The streaming method of this invention does not reject Fibre Channel host 52, but instead provides the equivalent of a signal saying SCSI Router 54 is working on the command. The command will sit in a queue until the required memory buffers become available from other I/Os that are completing. The method of this invention can reissue the same command back to the SCSI router and satisfy the command.

At step 62, Fibre Channel host 52 sends the first 64K block of data to SCSI router 54. Upon receiving the first 64K block of data, at step 64, SCSI router 54 transmits another transfer ready command requesting a second 64K block of data from Fibre Channel host 52. This process is repeated once again at steps 66 and 68 until SCSI router 54 has built up in a FIFO queue three 64K data blocks totaling the 192K minimum size data piece initially stored in the FIFO queue. The 64K data block size and the 192K build up size are representative only and can vary. Therefore, the number of data blocks stored in the FIFO queue (the FIFO queue is not shown in FIG. 3) can both vary in size and number depending on a given application. Note that the transfers shown at steps 58, 60, 64 and 68 are only command transfers and request messages, and no actual write data is transmitted.

At step 70 of FIG. 3 SCSI router 54 has stored three 64K blocks of data in the FIFO queue. The method of this invention forwards one of the 64K data blocks to SCSI target device 56 along with the write command for the entire 1 meg of data. Although SCSI router 54 forwards the write command for the entire 1 meg of data to SCSI target device 56, it initially only transfers one 64K data block. At step 72 SCSI target device 56 returns a message requesting the next 64K data block from SCSI router 54. At step 74 SCSI router 54 forwards the next topmost 64K data block from the FIFO queue to SCSI target 56. There is now only one 64K block of data remaining on the FIFO queue, and at step 76 SCSI router 54 sends a transfer ready signal to Fibre Channel host 52 requesting the next 64K block of data.

At step 78 Fibre Channel host 52 sends another 64K block of data to SCSI router 54. SCSI router 54 adds this next data block to the bottom of the FIFO queue. The FIFO queue in SCSI router 54 now contains two 64K blocks of data, and at step 80, SCSI target device 56 requests the next 64K block of data from SCSI router 54. Steps 76, 78 and 80 repeat until all the data has been written from Fibre Channel host 52 to SCSI router 56. The streaming method of this invention then terminates the write event at step 82 by receiving a "command complete" message from SCSI target device 56 and forwarding the message to Fibre Channel host 52.

Steps 76 through 82 implement the streaming aspect of the method of this invention for processing a write command from Fibre Channel host 52 to SCSI target device 56 through SCSI router 54. SCSI router 54 maintains at least one 64K block of data in the FIFO queue, in this example, by obtaining a 64K data block from Fibre Channel host 52 while simultaneously forwarding the topmost 64K data block in the FIFO queue to SCSI target 56. By streaming data in this way, whether to process a write command as in FIG. 3 or a read command, the streaming method of this invention quickly and efficiently maximizes the use of the memory in SCSI router 54 by simultaneously utilizing available memory buffers and freeing memory buffers for further use by either the same Fibre Channel host 52 or another Fibre Channel host.

The streaming method of this invention takes in data at the same rate that it forwards data to SCSI target device 56 once it has achieved a threshold number of data blocks in a FIFO queue within SCSI router 54. Both the size of the data blocks and the threshold number of data blocks that are first stored in the FIFO queue prior to forwarding any data to SCSI target device 56 can be set as required by a given application. Likewise, the number of data blocks left in the FIFO queue as a buffer for the streaming method can be set as required by a given application.

The initial number of data blocks that are stored in the FIFO queue prior to forwarding data to SCSI target device 56 provide for a guaranteed minimum number of available memory buffer blocks to implement the streaming method of this invention. This is because once the threshold number of data blocks are stored in the FIFO queue and streaming of data commences to SCSI target device 56, the memory buffer blocks used to store the initial number of data blocks are emptied and made available to store the next incoming data block from Fibre Channel host 52. The possibility of having to hold-off Fibre Channel host 52 is therefore reduced.

In the event that the write command from Fibre Channel host 52 is less than the threshold size (in this example 192K), the method of this invention saves off the data once sufficient memory buffers are available to hold all the data associated with the write command. When sufficient memory buffers are available, SCSI router 54 issues a transfer ready command requesting the data from Fibre Channel host 52. SCSI router 54 receives and stores the data in the available memory buffers and simply forwards the data to SCSI target device 56. In such a case, the streaming method of this invention is not required to process the command.

Figure 4:
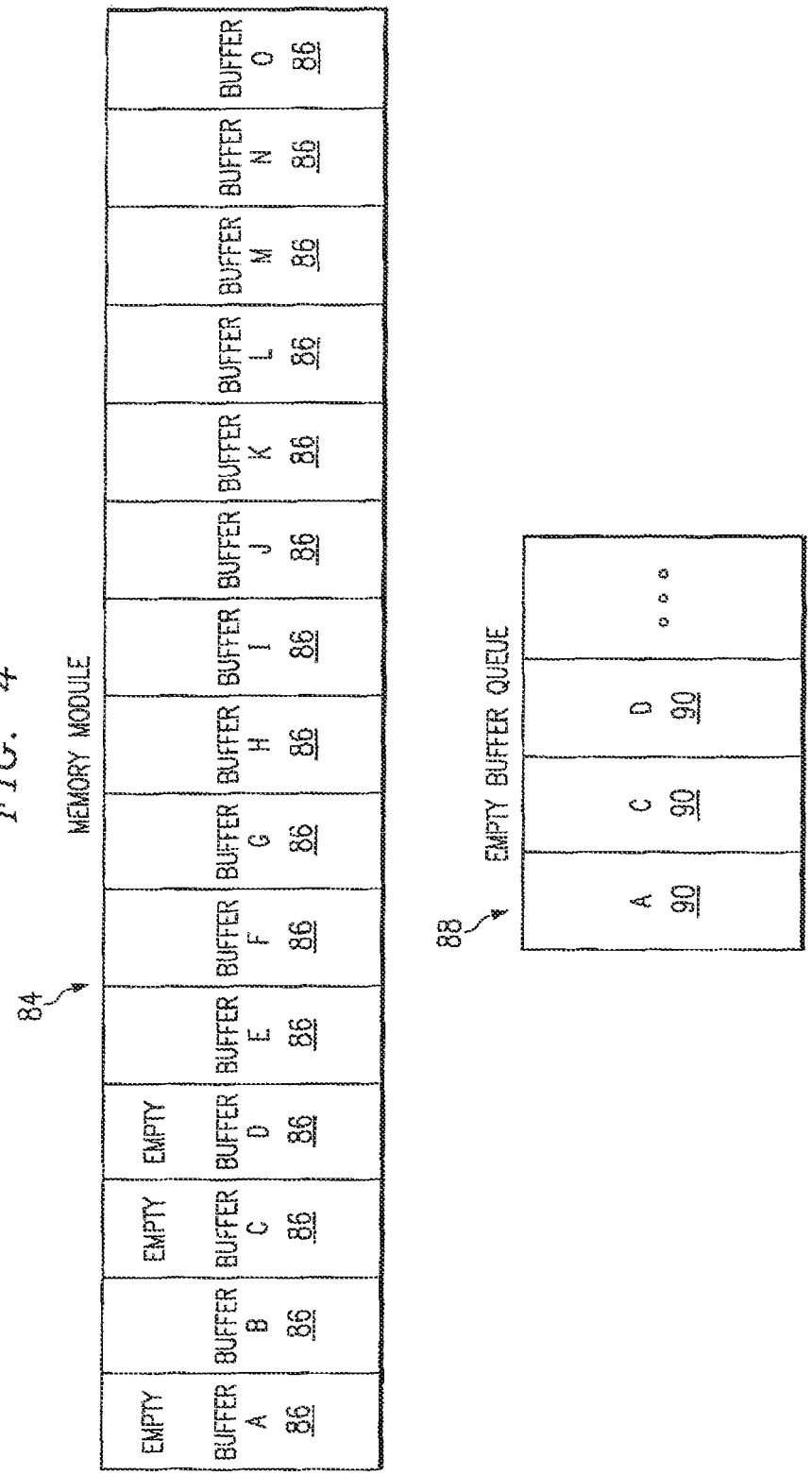
FIG. 4 is a block diagram of a possible memory module within a SCSI router of the streaming method and system of this invention divided into multiple memory buffers.

FIG. 4 is a conceptual representation of a possible memory module within SCSI router 54 of Fibre Channel network 10. FIG. 4 includes memory module 84 which upon initialization of SCSI router 54 is subdivided into memory buffers 86. The capacity (size) of memory buffers 86 can be set as required by a given application, for example 4K. The size and number of memory buffers 86 are therefore both variable. FIG. 4 also includes buffer queue 88 containing pointers 90. Pointers 90 are used to indicate (point) to the available empty buffers 86 within memory module 84 at any given point in time. SCSI router 54 can determine which memory buffers are empty and available for use upon receiving a write or read command from Fibre Channel host 52 using buffer queue 88.

Figure 5:
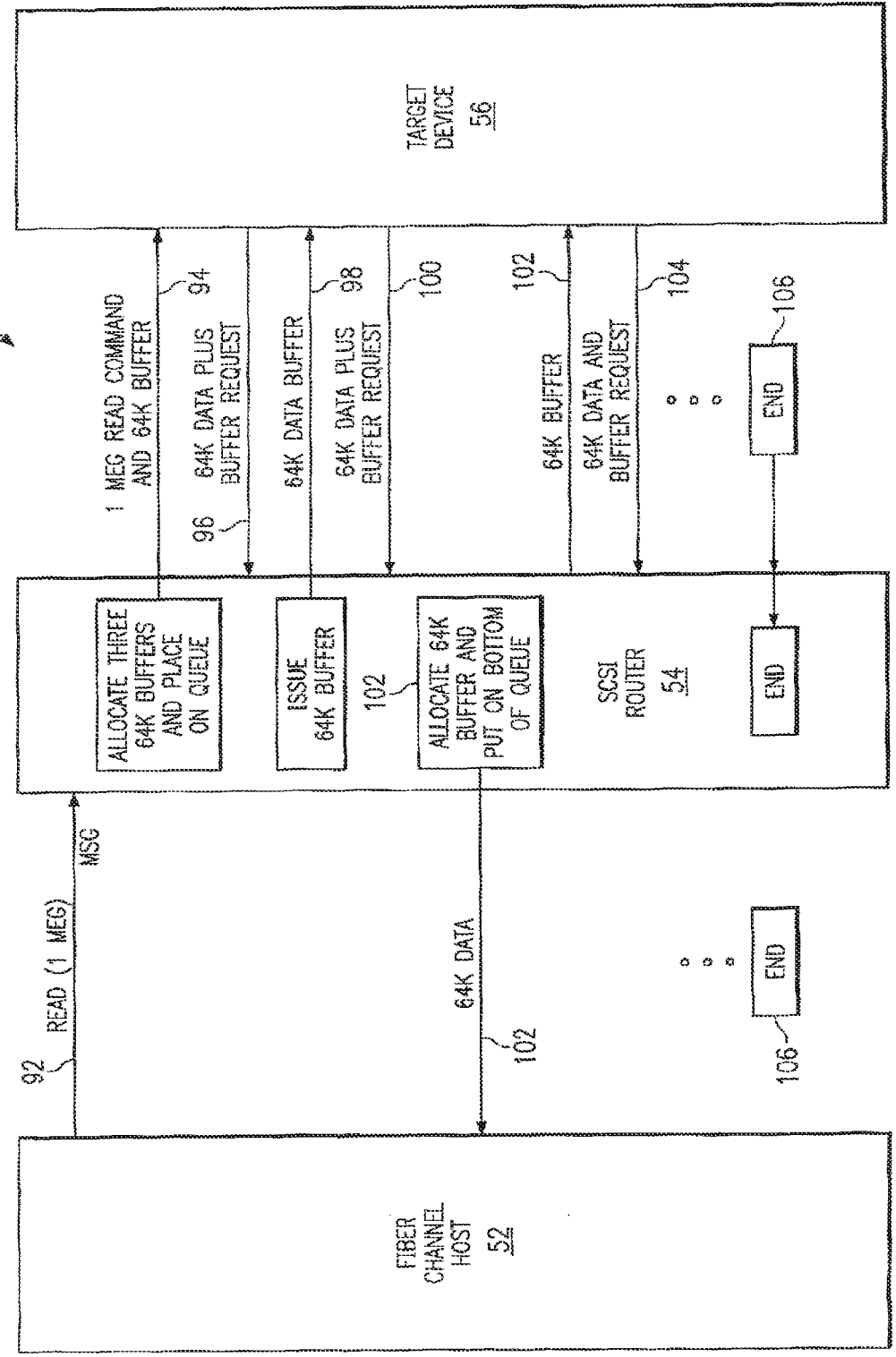
FIG. 5 is a conceptual hybrid flow/block diagram illustrating the streaming method of this invention for reading from a sequential access target device.

FIG. 5 is a conceptual hybrid flow diagram/block diagram illustrating the streaming method of this invention to process a read command from Fibre Channel host 52. FIG. 4 is an example of a read command for a one meg piece of data.

At step 92, Fibre Channel host 52 issues a read command to SCSI router 54. Although the read command in this example is a 1 meg read command, it can be of any size as required by a given application. SCSI router 54 receives the read command from Fibre Channel host 52 and at step 94 determines if the command requires a transfer of data larger than a threshold size. If it does, the method of this invention determines if a threshold number (three, in this example) of memory blocks are available and allocates the threshold number of memory blocks. In this example the memory blocks are 64K memory blocks. The memory blocks can be comprised of memory buffers 86 from FIG. 4. The memory block is placed on a buffer queue. If the threshold number of memory blocks is not available, the method of this invention holds off Fibre Channel host 52. The threshold number of memory blocks and their size can be set as necessary for a given application. Also at step 94, SCSI router 54 forwards the 1 meg read command and the first 64K free memory block to SCSI target device 56.

At step 96, SCSI target device 56 forwards the first 64K of data to SCSI router 54 along with a request for more memory blocks. SCSI router 54 places the 64K data block in the data FIFO queue. At step 98, SCSI router 54 takes the next 64K memory block off the buffer queue and forwards it to SCSI target device 56. SCSI target device 56 receives a memory block available message and forwards the next 64K data block along with a request for an additional memory block at step 100. The steps of receiving a data block from SCSI target device 56, placing the data block in the data FIFO queue, and forwarding the topmost memory block in the buffer FIFO queue to SCSI target device 56 repeat until a trigger number (one, in this example) of memory blocks remain in the buffer FIFO queue. Then, at step 102, SCSI router 54 forwards the first 64K data block from the data queue to Fibre Channel host 52. The trigger number of memory blocks can vary depending on the application.

The streaming method of this invention starts to stream data at step 102. SCSI router 54 contains two full 64K data blocks within the queue and one empty 64K memory block available for use by SCSI target device 56. Once this condition exists, SCSI router 54 at step 104 and subsequent steps receives the next 64K data block from SCSI target 56 along with a message requesting the next 64K memory block. SCSI router 54 forwards the topmost data block from the data FIFO queue to Fibre Channel host 52. This process of sending an empty 64K memory block from the top of the buffer queue to SCSI target 56 while receiving a 64K data block from SCSI target 56 and simultaneously forwarding the topmost 64K data block from the data FIFO queue to Fibre Channel host 52 implements the streaming method of this invention. Streaming of data from SCSI target 56 to Fibre Channel host 52 continues until, at step 106, the entire 1 meg of data has been transferred from SCSI target 56 to Fibre Channel host 52.

The streaming method of this invention as implemented for a read command is essentially the same concept as in the case of the write command shown in FIG. 3. During both a read and a write command the streaming method of this invention maintains a threshold number of data blocks in each FIFO queue for transmission to the recipient and a threshold number of empty memory buffers available for use for transmitting data.

FIG. 6 is a hybrid flow/block diagram illustrating the streaming method of this invention as implemented in Fibre Channel network 10 with a random access SCSI target device. FIG. 6 includes Fibre Channel host 52, SCSI router 54 and random access target device ("RATD") 108, together comprising Fibre Channel network 10. This alternative embodiment of the streaming method of this invention is conceptually the same as the embodiment for a sequential access target device. The difference is that a RATD does not require a continuous single read or write command, but can consist of a number of discrete individual read or write commands that can be recombined to form a large read or write command. As in the case of a sequential access device, the size of the data transfer blocks and the threshold number of blocks maintained in a FIFO queue can be set as required for a given application.

In the case of a RATD, a large write command (for example, the 1 meg write command of FIG. 6) can be broken down into a number of individual smaller write commands. One advantage of this over a sequential access target device is that multiple initiators can issue multiple commands to different targets simultaneously. A previous command need not be complete before a subsequent command begins executing. In this way multiple commands from multiple initiators to multiple targets can be in process simultaneously dependent upon the memory capacity of SCSI router 54.

Additionally, a sequential access target device cannot process tagged commands from a Fibre Channel host. A SATD requires that commands issued to it by a Fibre Channel host be untagged when received by the SATD, whether because the command was untagged when it left the Fibre Channel host or because the command is modified into an untagged command between leaving the Fibre Channel host and reaching the SATD. RATDs, however, are capable of processing tagged commands.

When reading or writing, a SATD inserts an end of record indicator at the completion of the read or write command. A SATD expects to find only one end-of-record indicator for each read or write command. RATDs, on the other hand, can take a relatively large read or write command and break it up into multiple individual read or write commands of a given size. For example, as shown in FIG. 6, the individual read or write commands can be a block size of 64K. Each of the separate data pieces that constitute the original large command can be written to the target as indicated by a starting block address and an end-of-record indicator. Each of the subsequent individual pieces is likewise written to the target, with the relationship between the addresses of individual data blocks maintained in, for example, a file allocation table, so that the data can be reconstituted at a later time. The Fibre channel host issuing the command determines the starting block address and the data block size.

As is the case of a SATD, the RATD embodiment of the streaming method of this invention provides a mechanism for holding-off Fibre Channel host 52 until a preset amount of memory buffers are available. However, once a threshold number of data blocks are received at SCSI router 54, individual data blocks can be sent with individual write commands to SCSI RATD 108.

At step 110 of FIG. 6, Fibre Channel host 52 transmits a 1 meg write command to SCSI router 54. At step 112, SCSI router 54 determines if the command involves a transfer of data larger than a threshold size, in this example 64K. If so, the method of this invention determines if a preset size memory block is free and transmits a transfer ready command requesting the first 64K block from Fibre Channel host 52 when the memory block is available. Otherwise, Fibre Channel host 52 is held-off.

At step 114, Fibre Channel host 52 sends the first 64K block of data to SCSI router 54. SCSI router 54 sets the data transfer length and starting address and stores the data block in a FIFO queue. The steps of determining if a sufficient memory block is free, requesting a data block from FC host 52, and receiving the data block in SCSI router 54 are repeated until an initial number of data blocks are stored in the FIFO queue. SCSI router 54 then forwards the first data block in the FIFO queue along with a 64K write command to SCSI RATD 108 at step 116.

At step 118, SCSI RATD 108 returns a command complete message to SCSI router 54. SCSI router 54 forwards the topmost data block in the FIFO queue to SCSI RATD 108 along with a write command for a write equal to the data transfer length, here 64K. The steps of receiving a command complete message from SCSI RATD 108 and forwarding the topmost data block in the FIFO queue to SCSI RATD 108 repeat until a trigger number of data blocks remain in the FIFO queue. The initial number of data blocks received in the FIFO queue, the trigger number of data blocks in the FIFO queue, and the preset memory size can vary as required for a given application.

At step 120, SCSI router 54 sends a transfer ready command to Fibre Channel host 52 requesting the next 64K data block. The streaming method for processing commands of this embodiment of the present invention is implemented in the memory management illustrated at steps 116 through 122. Once SCSI RATD 108 has written, at step 116, the first 64K block of data received, the 64K data buffer used to store the data block is once again free for use by SCSI router 54. SCSI router 54 takes advantage of this and fills the now empty and available 64K memory buffer with the 64K of data received from Fibre Channel host 52 at step 122. As a 64K memory block becomes free after writing data to SCSI RATD 108, SCSI router 54 receives a command complete message from SCSI RATD 108 indicating that a memory buffer block is available. SCSI router 54 transmits a transfer ready command to Fibre Channel host 52 and receives a 64K data block to fill the recently available empty 64K memory block.

At step 124, the next topmost 64K data block in the FIFO queue is received at SCSI router 54, which sets the transfer length to 64K and additionally sets a relative write offset to indicate the starting block address for the write corresponding to the next 64K data block. SCSI router 54 forwards this second 64K data block, at step 126, along with a second discrete 64K write command with a starting address determined by the relative offset set in step 124. At step 128, SCSI RATD 108 sends back a command complete message to SCSI router 54. Steps 120 through 128 are repeated until all of the data has been written to SCSI RATD 108. Each subsequent 64K write command can have a relative write offset to provide a starting address used to reconstitute the one meg write when the data is read. At step 130, the write is complete.

Although the initial number of data blocks stored in the FIFO queue in the example of FIG. 6 is only one, any number of data blocks can be initially stored in the FIFO queue. For example, as in the case illustrated in FIG. 3 for a SATD, three data blocks can be initially stored in the FIFO queue.

One of the many advantages of using the streaming method of this invention with a RATD is that multiple Fibre Channel hosts can issue multiple commands to multiple target devices without causing an error or loss of data. Depending upon the capacity of SCSI router 54, multiple commands can be in progress simultaneously. This is because the discrete writes constituting a larger write, for example, that of FIG. 6, issued by Fibre Channel host 52 can be reconstituted into a larger whole so long as the starting addresses and sequence of writes are known. The capability also exists for writing the individual data blocks out of sequence from how they were received.

The streaming method of this invention can provide for more efficient memory pool usage and consequently can provide the capability for handling read/write commands from multiple Fibre Channel hosts without losing any of the commands. Because the memory pool is more efficiently used memory buffers are made available for use as they are emptied out, commands from other Fibre Channel hosts need not be rejected, but instead can be held-off until the required memory becomes available. The robustness of the network is therefore improved.

FIG. 7 is a hybrid block/flow diagram illustrating the streaming method of this invention as implemented for a read command to a RATD. At step 140, Fibre Channel host 52 issues a one meg read command. SCSI router 54 receives the one meg read command and determines if the command requires a data transfer longer than a threshold size. If so, the method of this invention determines if a threshold number of memory blocks are free. This threshold number of memory blocks can vary as needed. If the threshold number of memory blocks is free, they are placed in a buffer FIFO queue. In this example, the memory blocks are 64K memory blocks, but the size can vary as required for a given application.

At step 142, the threshold number of memory blocks (three, in this example) are placed in the buffer FIFO queue, the data transfer length is set to 64K, and the starting address for the first data block is set. Also at step 142, SCSI router 54 forwards a 64K read command and the topmost 64K memory block from the buffer FIFO queue to SCSI RATD 108. At step 144, SCSI RATD 108 sends back a command complete message along with a 64K data block to SCSI router 54. SCSI router 54 places the data block in a data FIFO queue.

At step 146, SCSI router 54 allocates the topmost memory block in the buffer FIFO queue and sets a relative read offset for determining the starting position of any subsequent 64K data blocks as read from SCSI RATD 108. At step 148, SCSI router 54 forwards a 64K read command and the topmost 64K memory block from the buffer FIFO queue to SCSI RATD 108. The steps of forwarding a topmost memory block from the FIFO queue to SCSI RATD 108 and receiving a 64K data block and a command complete message from SCSI RATD 108 repeat until a trigger number of memory blocks remain in the FIFO queue. This trigger number can vary as required.

At step 150, SCSI RATD 108 forwards a command complete message to SCSI router 54 along with a 64K data block. Since the trigger number of data blocks exists in the buffer FIFO queue, SCSI router 54 forwards the first of the 64K data block from the data FIFO queue to Fibre Channel host 52. Steps 146 through 150 are repeated until all of the data has been read from SCSI RATD 108 and transferred to Fibre Channel host 52.

The streaming method of this invention is implemented by forwarding a 64K data block to Fibre Channel host 52 simultaneously with receiving a 64K data block from SCSI RATD 108. As part of implementing the streaming method of this invention with regards to a read command for a RATD such as a disk drive, SCSI router 54 allocates a minimum number of 64K data blocks to be maintained in the data FIFO queue. This is done to avoid the possibility of not having either the data blocks available to send to Fibre Channel host 52 as it requests them, or not having memory blocks available for the SCSI target device as it requests them. An analogous method for maintaining data blocks and memory blocks available for Fibre Channel host 52 and an associated SCSI target device is implemented for both read and write commands in each of the RATD and SATD embodiments of this invention.

The streaming method of this invention continues until, at step 152, all of the data requested by Fibre Channel host 52 has been received from SCSI random access target device 108. If the command requires a data transfer smaller than the threshold size, the streaming method of this invention simply saves all the data to memory and forwards the data to Fibre Channel host 52, in manner similar to that discussed above.

Although the present invention has been described in detail herein with reference to the illustrated embodiments, it should be understood that the description is by way of example only and is not to be construed in a limiting sense. It is to be further understood, therefore, that numerous changes and the details of the embodiment of this invention and additional embodiments of this invention will be apparent, and may be made by, persons of ordinary skill in the art having reference to this description. It is contemplated that all such changes and additional embodiments are within the spirit and true scope of the invention as claimed below.

What is claimed is:

1. A method of streaming data using a router, the method comprising:
   receiving, at the router, a command to read blocks of data from, or write blocks of data to, a target device, wherein the command was received from a host connected to a first transport medium and the target device is connected to a second transport medium;
   determining, at the router, that the command requires a transfer of data larger than a threshold size;
   receiving, at the router, a plurality of data blocks associated with the command;
   storing, at the router, the plurality of data blocks in at least one buffer;
   determining, at the router, that there is an initial amount of data in the at least one buffer;
   forwarding, from the router to the host or target device, at least one of the plurality of data blocks when it has been determined that there is the initial amount of data in the at least one buffer; and
   requesting, from the router, an additional data block associated with the command.

2. The method of claim 1, wherein the first transport medium is fibre channel and the second transport medium is SCSI.

3. The method of claim 1, wherein the target device is a sequential access target device.

4. The method of claim 1, wherein the target device is a random access target device.

5. The method of claim 1, wherein the plurality of data blocks are received from a host using a first protocol and forwarded to a target device using a second protocol.

6. The method of claim 5, wherein the first protocol is the same as the second protocol.

7. A router, comprising:
   a processor; and
   a non-transitory computer storing instructions for:
      receiving, at the router, a command to read blocks of data from, or write blocks of data to, a target device, wherein the command was received from a host connected to a first transport medium and the target device is connected to a second transport medium;
      determining, at the router, that the command requires a transfer of data larger than a threshold size;
      receiving, at the router, a plurality of data blocks associated with the command;
      storing, at the router, the plurality of data blocks in at least one buffer;
      determining, at the router, that there is an initial amount of data in the at least one buffer;
      forwarding, from the router to the host or target device, at least one of the plurality of data blocks when it has been determined that there is the initial amount of data in the at least one buffer; and
      requesting, from the router, an additional data block associated with the command.

8. The router of claim 7, wherein the first transport medium and the second transport medium are the same.

9. The router of claim 7, wherein the first transport medium is fibre channel and the second transport medium is SCSI.

10. The router of claim 7, wherein the target device is a sequential access target device.

11. The router of claim 7, wherein the target device is a random access target device.

12. The router of claim 7, wherein the plurality of data blocks are received from a host using a first protocol and forwarded to a target device using a second protocol.

13. The router of claim 12, wherein the first protocol is the same as the second protocol.

14. A non-transitory computer readable medium storing instructions for:
   receiving, at a router, a command to read blocks of data from, or write blocks of data to, a target device, wherein the command was received from a host connected to a first transport medium and the target device is connected to a second transport medium;
   determining, at the router, that the command requires a transfer of data larger than a threshold size;
   receiving, at the router, a plurality of data blocks associated with the command;
   storing, at the router, the plurality of data blocks in at least one buffer;
   determining, at the router, that there is an initial amount of data in the at least one buffer;
   forwarding, from router to the host or target device, at least one of the plurality of data blocks when it has been determined that there is the initial amount of data in the at least one buffer; and
   requesting, from the router, an additional data block associated with the command.

15. The non-transitory computer readable medium of claim 14, wherein the first transport medium and the second transport medium are the same.

16. The non-transitory computer readable medium of claim 14, wherein the first transport medium is fibre channel and the second transport medium is SCSI.

17. The non-transitory computer readable medium of claim 14, wherein the target device is a sequential access target device.

18. The non-transitory computer readable medium of claim 14, wherein the target device is a random access target device.

19. The non-transitory computer readable medium of claim 14, wherein the plurality of data blocks are received from a host using a first protocol and forwarded to a target device using a second protocol.

20. The non-transitory computer readable medium of claim 19, wherein the first protocol is the same as the second protocol.

* * * * *

UNITED STATES PATENT AND TRADEMARK OFFICE
CERTIFICATE OF CORRECTION

| | | |
|---|---|---|
| PATENT NO. | : 9,455,938 B2 | Page 1 of 1 |
| APPLICATION NO. | : 14/519977 | |
| DATED | : September 27, 2016 | |
| INVENTOR(S) | : Keith M. Arroyo et al. | |

It is certified that error appears in the above-identified patent and that said Letters Patent is hereby corrected as shown below:

In the claims

Claim 14:

Column 16, Line 37, insert -- the -- between "forwarding," and "router"

Signed and Sealed this
Thirteenth Day of December, 2016

Michelle K. Lee
*Director of the United States Patent and Trademark Office*